May 9, 1950  P. W. MOORE, JR  2,507,452
STOCK LENGTH GAUGE FOR SHEARING MACHINES
Filed July 22, 1948  2 Sheets-Sheet 1
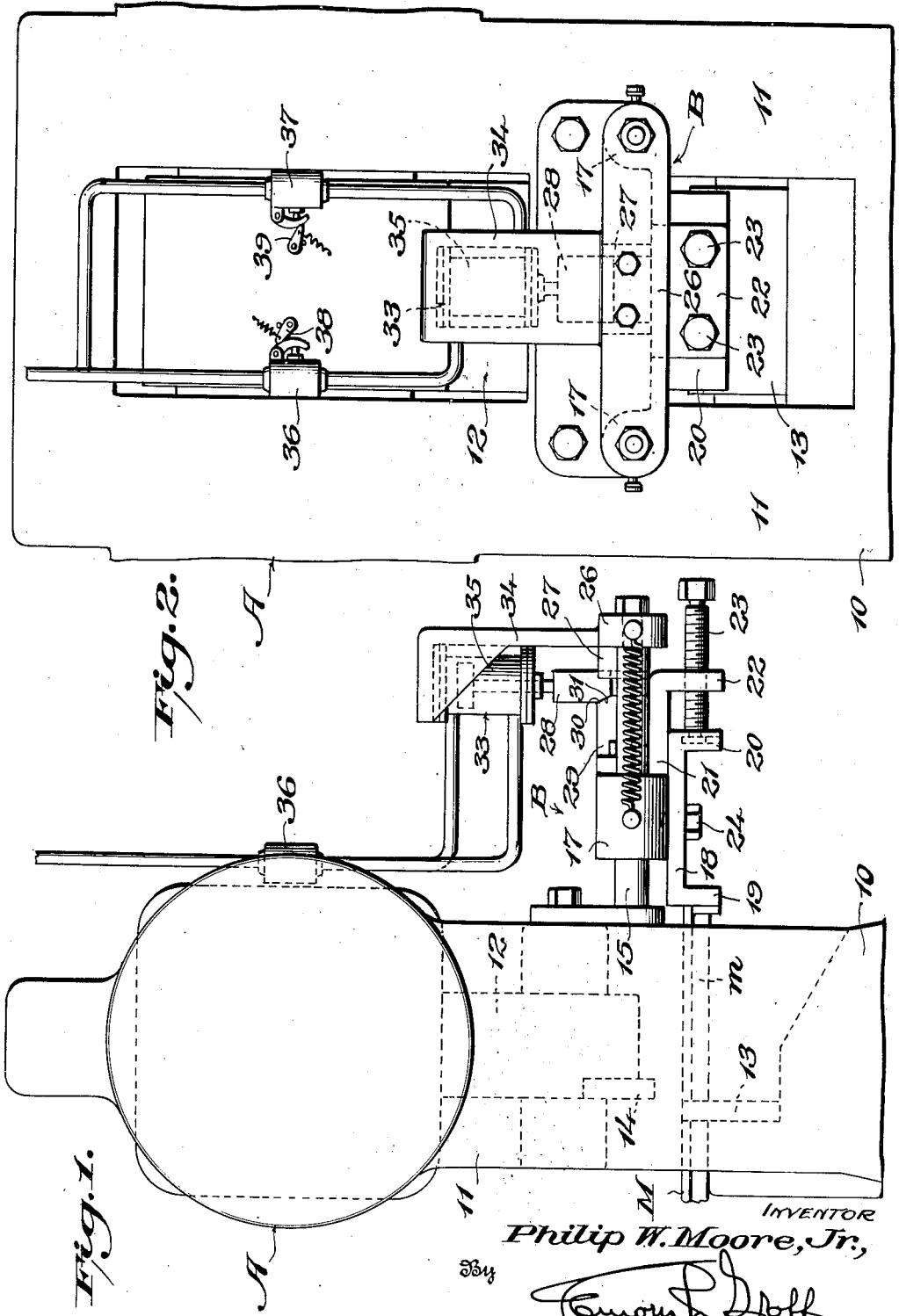
INVENTOR
Philip W. Moore, Jr.,
By
ATTORNEY

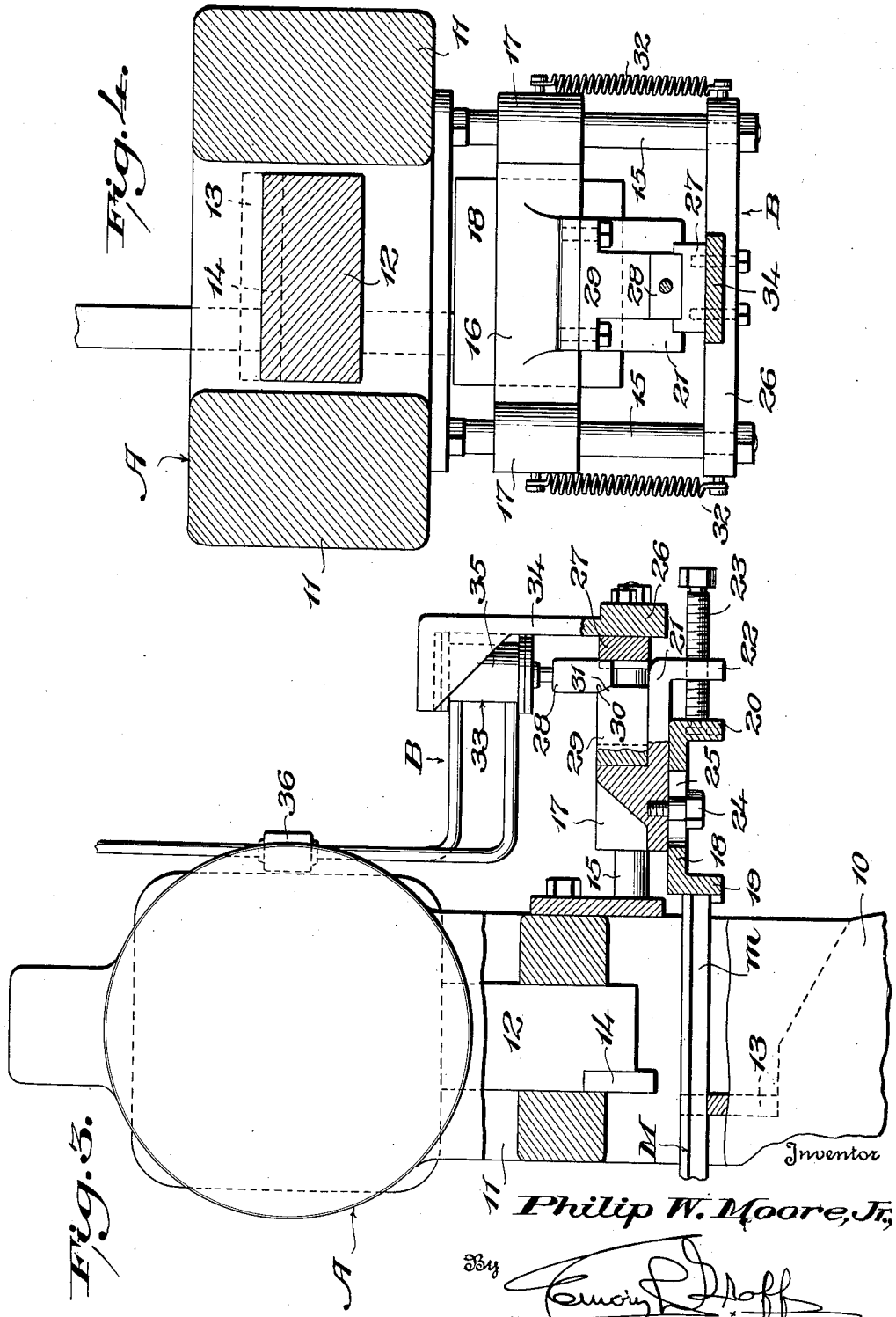

Patented May 9, 1950

2,507,452

UNITED STATES PATENT OFFICE 2,507,452

STOCK LENGTH GAUGE FOR SHEARING MACHINES

Philip W. Moore, Jr., Winnetka, Ill., assignor to Poor & Company, Chicago, Ill., a corporation of Delaware Application July 22, 1948, Serial No. 40,053

5 Claims. (Cl. 164—59)

This invention relates to stock-length gauge mechanisms for shearing machines of the so-called guillotine type.

A primary object is to provide means operated by a fluid-controlled unit synchronized with both the descent and ascent of the ram which carries the movable blade of the shear automatically to adjust the length of the blank to correct given size regardless of ordinary variation in the feeding stroke of the bar stock, thereby to reduce waste and insure maximum efficiency in the shearing operation independently of the force with which the bar stock is fed to the machine.

Another object of the invention is to provide a gauge mechanism including a compact combination and arrangement of parts which may be mounted above the line of bar feed and consequently substantially above the position of the blades to facilitate access thereto from the rear of the shear for purposes of their removal and replacement or repair.

A further object of the invention is to provide a gauge mechanism which operates substantially without shock to either the shear or the mechanism itself thereby reducing vibration and consequent wear and maladjustment of the entire apparatus.

A still further object of the invention is to provide a shearing machine gauge mechanism of the type mentioned which employs a cylinder and positively controlled fluid piston power unit and a novel, compact arrangement of cooperating parts including a wedge element operable by said power unit to move the stock abutment or stop element of the mechanism toward the blades of the shearing machine.

With the foregoing and other objects in view, which will become more fully apparent as the nature of the invention is better understood, the same consists in a shearing machine gauge mechanism embodying the novel features of construction, combination and arrangement of parts as are illustrated by way of example in the accompanying drawings and as will be hereinafter more fully described and claimed.

In the accompanying drawings, wherein like characters of reference denote corresponding parts in the different views:

Figure 1 is a side elevation of a portion of a shearing machine of the "guillotine" type equipped with a gauge mechanism in accordance with the invention.

Figure 2 is a rear elevation of the structure shown in Figure 1.

Figure 3 is a longitudinal section through the structure shown in Figure 1; and

Figure 4 is a vertical section through the structure shown in Figure 1.

Referring to the drawings in detail, A designates, generally, a portion of a shearing machine of the "guillotine" type, and B designates, generally, a gauge mechanism constructed in accordance with the invention and operatively applied to said machine.

The machine A includes, as usual, a base 10, side arms 11 rising from said base, a ram 12 vertically reciprocable between said side arms, a fixed lower blade 13 carried by said base, and a cooperating vertically movable upper blade 14 carried by said ram.

A piece of stock material to be cut is designated as M and is insertable endwise from the front of the machine A between the blades 13 and 14 when the ram 12 and the upper blade 14 are raised so that upon downward movement of the said ram and said upper blade a section $m$ is cut from said bar length M.

Should a fixed abutment be employed against which to advance the piece of material M in order to predetermine the length of the section $m$, the piece of material M might bounce away from said abutment or might not be advanced quite far enough to contact the same, with the result that the section $m$ would be of indefinite length. Therefore, the gauge mechanism B is operable to permit the piece of material M to be advanced a greater distance beyond the blades 13, 14 than the predetermined length of the section $m$ to be cut, and then, prior to descent of the blade 14, is operable to return the piece of material M a short distance relative to the blades 13, 14 to exactly predetermine the length of the section $m$.

The gauge mechanism comprises a pair of horizontally disposed, laterally spaced apart supporting rods 15 suitably secured at their front ends to the machine A and extending suitable distances rearwardly from said machine in a horizontal plane above the top of the lower knife 13.

Extending between the rods 15 is a bar 16 which is provided at its ends with eye formations 17 through which said rods 15 extend, whereby said bar is supported by said rods for sliding movement therealong rearwardly away from and forwardly toward the blades 13, 14.

Suitably secured against the bottom of the bar 16 for forward and rearward adjustment relative thereto is a gauge block 18 which appropriately may comprise a short piece of channel stock having downwardly extending front and rear flanges 19 and 20, respectively, the former of which is disposed approximately in horizontal alinement with the top of the blade 13 and constitutes an abutment or stop engageable by the forward end of the piece of material M.

Extending rearwardly from the bar 16 is an arm 21 which has a downwardly extending terminal portion 22 disposed behind the rear flange 20 of said bar 16. Extending through and threaded in the portion 22 are screws 23 which have suitable swivel connections with the flange 20 whereby they are operable to adjust the gauge block 18 forwardly and rearwardly relative to the bar 16.

Bolts 24 extending through slots 25 in the gauge block 18 and threaded in the bar 16 may be employed to secure said gauge block to said bar for forward and rearward adjustments relative thereto. Thus, upon loosening of the bolts 24, the screws 23 may be employed to adjust the gauge block 18 forwardly or rearwardly relative to the bar 16. By then tightening the bolts 24 the adjustment may be maintained.

Extending between and rigidly secured to the rear end portions of the rod 15 is a cross bar 26 which carries, medially thereof and at its front side, a guide member 27 for a vertically reciprocable wedge element 28, while carried by the cross bar 16 medially thereof and in forward and rearward alinement with the guide member 27, is a block 29 the upper portion of the rear face of which has an upwardly and forwardly inclined wedge surface 30.

The wedge element 28 has a lower, front, upwardly and forwardly inclined wedge surface 31 for cooperation with the wedge surface 30, and said wedge element is downwardly projectable between the guide member 27 and the block 29 to cause the wedge surfaces 30, 31 to coact to move the bar 16 and the gauge block 18 a short distance forwardly.

Connecting the cross bar 16 with the cross bar 26 are contractile spiral springs 32 which are effective to move said cross bar 16 and the gauge block 18 rearwardly when the wedge element 28 is withdrawn upwardly following its downward projection. In this connection the wedge element 28 may be withdrawn upwardly only until its wedge surface 30 mates with the wedge surface 31 so that said wedge element may constitute a stop to limit rearward movement of the cross bar 16 and the gauge block 18 by the springs 32. Alternatively, any other suitable stop means may be provided to limit rearward movement of said cross bar 16 and the gauge block 18. In any event, the arrangement is such that whenever the wedge element 28 is retracted, the gauge block 18 is moved a short distance rearwardly, and whenever said wedge element is projected said gauge block is advanced a short distance forwardly.

A fluid-operable cylinder and piston power unit 33 is employed for projecting and retracting the wedge element 28 and is mounted, in accordance with the invention, upon an arm 34 which is rigid with and extends upwardly from the cross bar 26.

Admission and exhaust of fluid under pressure to and from the upper and the lower ends of the cylinder 35 of the power unit 33 for the purpose of projecting and retracting the wedge element 28 is under the control of a pair of valves 36 and 37 which appropriately may be mounted on the arms 11, 11, respectively, of the machine A and which may be of any suitable type for actuation by a pair of dogs 38 and 39, respectively, carried by the ram 12. In this connection, the arrangement is such that as the ram 12 is moved downwardly, the dog 38 actuates the valve 36 to admit fluid under pressure to the upper end of the cylinder 35 to cause the wedge element 28 to be projected downwardly to move the gauge block 18 forwardly, while as said ram 12 is moved upwardly, the dog 39 actuates the valve 37 to admit fluid under pressure to the lower end of the cylinder 35 to retract the wedge element 28 and permit the springs 32 to move the gauge block 29 rearwardly.

Now, assuming that the ram 12 and the knife 14 are raised; that the wedge element 28 therefore is retracted; that the gauge block 18 is held in its rearwardly retracted position by the springs 32; and that a bar or other piece of material M has been advanced between the knives 13, 14 until its forward end is in contact with or adjacent to the stop flange 19 of the gauge block 18, it will be apparent that as the ram 12 is moved downwardly the valve 36 will be actuated to admit fluid under pressure to the upper end of the cylinder 35 with the result that the wedge element 28 will be projected downwardly before, of course, the upper knife 14 engages the material M. Upon downward projection of the wedge element 28, the cross bar 16 and the gauge block 18 will be moved forwardly until the stop flange 19 is spaced a definite distance rearwardly from the knives 13, 14, and as said gauge block is moved forwardly the stop flange 19, if not initially in engagement with the forward end of the piece of material M, will engage the said forward end of the piece of material and move the same rearwardly until the stop flange 19 is a definite distance from the knives 13, 14 as determined by adjustment of the gauge block 18 relative to the cross bar 16 and the amount of forward movement imparted to said cross bar and gauge block by the wedge element 28. The section m of the piece of material M thus will be of exact length which may be predetermined by adjustment of the gauge block 18 relative to the cross bar 16.

As will be noted, the supporting rods 15 and the cross bar 16 of the present gauge mechanism are disposed above the horizontal plane of the upper edge of the knife 13, which is quite advantageous in that it permits ready access to the lower knife 13 whenever it is desired to remove and replace the same. It will also be noted that the present gauge mechanism advantageously extends only a minor distance behind the machine A and is of low height, compact design. Moreover, it will be appreciated that since the power unit 33 reacts from the cross bar 26 and, hence, from the rods 15 to move the cross bar 16 and the gauge block 18 along said rods 15, the mechanism is subjected to little or no shock, but operated smoothly and therefore possesses long life.

From the foregoing description considered in connection with the accompanying drawings, it is believed that the construction and operation of the present gauge mechanism will be clearly understood and its advantages appreciated. It is desired to point out, however, that while only a single specific structural embodiment of the invention has been illustrated and described, the same is readily capable of specifically different structural embodiments within its spirit and scope as defined in the appended claims.

I claim:

1. In a shearing machine of the type comprising a lower fixed knife and a vertically reciprocable ram carrying an upper vertically reciprocable cooperating knife, a pair of laterally spaced apart horizontally disposed rods fixed to said machine and extending rearwardly therefrom in a horizontal plane above the horizontal plane of the top of the lower knife, stop means mounted on said rods for forward and rearward sliding movements therealong and disposed approximately in the horizontal plane of the top of the lower knife to be engaged by the leading end of a piece of material advanced between the knives of the machine, power means operable in response to downward movement of said ram to move said stop means forwardly to a position spaced a definite distance from said knives and operable in response to upward movement of said ram to release said stop means for rearward movement, and spring means for effecting rearward movement of said stop means when the latter is released.

2. In a shearing machine of the type comprising a lower fixed knife and a vertically reciprocable ram carrying an upper vertically reciprocable cooperating knife, a pair of laterally spaced apart horizontally disposed rods fixed to said machine and extending rearwardly therefrom in a horizontal plane above the horizontal plane of the lower knife, a cross bar extending between and mounted at its ends upon said rods for forward and rearward sliding movements therealong, said cross bar also being disposed above the horizontal plane of the top of the lower knife, stop means carried by said cross bar and disposed approximately in the horizontal plane of the top of the lower knife to be engaged by the leading end of a piece of material advanced between the knives of the machine, power means operable in response to downward movement of said ram to move said cross bar and said stop means forwardly to a position in which said stop means is spaced a definite distance from said knives and operable in reponse to upward movement of said ram to release said cross bar and said stop means for rearward movement, and spring means for effecting rearward movement of said cross bar and said stop means when the same are released.

3. In a shearing machine of the type comprising a lower fixed knife and a vertically reciprocable ram carrying an upper vertically reciprocable cooperating knife, a pair of laterally spaced apart horizontally disposed rods fixed to said machine and extending rearwardly therefrom in a horizontal plane, a cross bar extending between and rigidly mounted upon the rear end portions of said rods, stop means mounted on said rods for forward and rearward sliding movements therealong and disposed to be engaged by the leading end of a piece of material advanced between the knives of the machine, a vertically reciprocable wedge element interposed between said cross bar and said stop means and operable by movement in one direction to move said stop means forwardly to a position in which it is spaced a definite distance rearwardly from said knives, means for moving said stop means rearwardly from its said forwardly disposed position when said wedge element is moved in its opposite direction, a fluid-operable cylinder and piston power unit mounted upon said cross bar for vertically reciprocating said wedge element, and means operable by said ram to control operation of said power unit so that said stop means is moved to its forwardly disposed position as said ram descends and is released for rearward movement as said ram rises.

4. In a shearing machine of the type comprising a lower fixed knife and a vertically reciprocable ram carrying an upper vertically reciprocable cooperating knife, a pair of laterally spaced apart horizontally disposed rods fixed to said machine and extending rearwardly therefrom in a horizontal plane, a cross bar extending between and rigidly mounted upon the rear end portions of said rods, a second cross bar mounted on said rods for sliding movements therealong, a stop element carried by said second mentioned cross bar and disposed to be engaged by the leading end of a piece of material advanced between the knives of the machine, a vertically reciprocable wedge element interposed between said cross bars and operable by movement in one direction to move said second mentioned cross bar and said stop means forwardly to a position in which said stop means is spaced a definite distance rearwardly from said knives, means for moving said second mentioned cross bar and said stop means rearwardly from their forwardly disposed positions, when said wedge element is moved in its opposite direction, an arm rising from said second mentioned cross bar, a fluid-operable cylinder and piston power unit mounted upon said arm and operatively connected to said wedge element for vertically reciprocating the latter, and means operable by said ram to control operation of said power unit so that said stop means is moved to its forwardly disposed position as said ram descends and is released for rearward movement as said ram rises.

5. In a shearing machine of the type comprising a lower fixed knife and a vertically reciprocable ram carrying an upper vertically reciprocable cooperating knife, supporting means extending rearwardly from the machine, stop means mounted on said supporting means for forward and rearward movements therealong and disposed to be engaged by the leading end of a piece of material advanced between the knives of the machine, wedge means projectable to move said stop means forwardly to a position in which it is spaced a definite distance rearwardly of said knives, fluid-operable cylinder and piston power means mounted on said supporting means for projecting said wedge means to advance said stop means, spring means to return said stop means to a rearwardly disposed position when said wedge means is retracted, and valves operable by said ram to control supply of fluid to said cylinder and piston, power means so that said stop means is moved forwardly as said ram descends and is moved rearwardly as said ram ascends.

PHILIP W. MOORE, Jr.

REFERENCES CITED

The following references are of record in the file of this patent:

UNITED STATES PATENTS

| Number | Name | Date |
|---|---|---|
| 2,165,614 | Cook et al. | July 11, 1939 |